(12) United States Patent
Kastl et al.

(10) Patent No.: US 6,447,248 B1
(45) Date of Patent: Sep. 10, 2002

(54) BEARING SUPPORT FUSE

(75) Inventors: John Andrew Kastl, Wahoo, NE (US); Randy Marinus Vondrell, Sharonville, OH (US)

(73) Assignee: General Electric Company, Schenectady, NY (US)

( * ) Notice: Subject to any disclaimer, the term of this patent is extended or adjusted under 35 U.S.C. 154(b) by 97 days.

(21) Appl. No.: 09/693,449

(22) Filed: Oct. 20, 2000

(51) Int. Cl.[7] .................... F01B 25/16; F01D 21/04
(52) U.S. Cl. ............... 416/2; 416/244 A; 415/9; 415/174.4; 384/535; 384/624; 60/223
(58) Field of Search ............... 415/9, 229, 142, 415/174.4; 416/2, 244 A; 60/226.1, 223; 384/535, 581, 624

(56) References Cited

U.S. PATENT DOCUMENTS

| | | |
|---|---|---|
| 5,417,501 A | 5/1995 | Hyde et al. |
| 5,733,050 A | 3/1998 | Diepolder et al. |
| 6,009,701 A * | 1/2000 | Freeman et al. ............ 384/624 |
| 6,135,712 A * | 10/2000 | Chevrollier et al. ........ 415/177 |
| 6,240,719 B1 * | 6/2001 | Vondrell et al. ............... 60/223 |
| 6,325,546 B1 * | 12/2001 | Storace ................... 384/624 X |

OTHER PUBLICATIONS

U.S. patent application Ser. No. 09/692,947, filed Oct. 20, 2000, entitled "Fan Decoupling Fuse," docket 13DV–13119.
GE Aircraft Engines, "GE90 Fan Forward Support," in commercial use in the United States for more than one year, single page drawing excerpt.

* cited by examiner

Primary Examiner—Edward K. Look
Assistant Examiner—Richard A. Edgar
(74) Attorney, Agent, or Firm—Nathan D. Herkamp; Francis L. Conte

(57) ABSTRACT

A bearing support includes a hollow cone diverging between a forward bearing seat and an aft mounting flange. The cone includes an integral annular fuse sized in thickness to fail in shear under abnormal imbalance load transfer between a gas turbine engine fan supported by a bearing in the forward seat and a fan frame mounted to the aft flange.

22 Claims, 3 Drawing Sheets

BEARING SUPPORT FUSE

The present invention relates generally to gas turbine engines, and, more specifically, to turbofan engines.

A turbofan gas turbine engine includes a fan for pressurizing ambient air to produce propulsion thrust for powering an aircraft in flight, with the fan being powered by a core engine. Disposed downstream from the fan is a multi-stage axial compressor that pressurizes a portion of the fan air which is then mixed with fuel in a combustor for generating hot combustion gases which flow downstream through turbine stages that extract energy therefrom. A high pressure turbine powers the compressor by rotating a shaft therebetween. And, a low pressure turbine powers the fan by rotating a fan shaft therebetween.

The fan shaft is supported in a bearing near the fan with the bearing in turn being supported by a bearing support fixedly joined to a stationary fan frame. During normal operation, the fan rotates dynamically balanced, and the fan bearing maintains concentric alignment of the fan within a surrounding fan casing, and carries operational loads into the fan frame.

The fan includes a row of large rotor fan blades extending radially outwardly from a supporting rotor disk, and is subject to foreign object damage (FOD). For example, a large bird may be ingested by the engine and strike one or more of the fan blades causing substantial damage thereto including liberation thereof from the supporting fan disk. Accordingly, a substantial rotary unbalance or imbalance load will be created in the damaged fan, which imbalance load must be suitably carried by the fan bearing, its support, and fan frame.

In order to accommodate the possibility of such a large abnormal imbalance load, the various supporting components for the fan may be sized for additional strength required therefor. However, the stronger supporting components undesirably increase weight of the engine and decrease overall efficiency of the engine when used in normal operation without substantial rotor imbalance.

Another solution for large imbalance loads is the introduction of a bearing support which intentionally severs in the imbalance event for decoupling the fan from the bearing support. In this event, the fan is supported by its relatively flexible fan shaft which reduces the fan critical speed well below the maximum operating speed thereof. The fan accordingly operates dynamically supercritical for significantly reducing orbit of the fan disk and imbalance loads therefrom. The fan speed is then reduced and crosses the fan critical speed at a relatively low value with rapid deceleration having correspondingly reduced peak loads therefrom.

The stiffened bearing support configuration is sufficiently strong to prevent any structural failure thereof. However, by softening the structural loadpath to introduce intentional failure for abnormal fan loads, the loadpath components are subject to undesirable fatigue damage which could adversely reduce the life thereof.

The ability to introduce the decoupling bearing support is limited by the particular bearing support design and available space. Since the bearing support is located radially inwardly of the fan blades, little available space is provided for introducing decoupling features without undesirably increasing the overall diameter of the fan. And, the decoupling configuration should have minimal variability between the maximum load capability thereof prior to the decoupling failure and the minimum load capability for normal operation without accumulating life-limiting fatigue damage.

Accordingly, it is desired to provide an improved fan decoupling system with minimal variability between maximum load capability and minimum load capability without life-limiting fatigue damage.

BRIEF SUMMARY OF THE INVENTION

A bearing support includes a hollow cone diverging between a forward bearing seat and an aft mounting flange. The cone includes an integral annular fuse sized in thickness to fail in shear under abnormal imbalance load transfer between a gas turbine engine fan supported by a bearing in the forward seat and a fan frame mounted to the aft flange.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
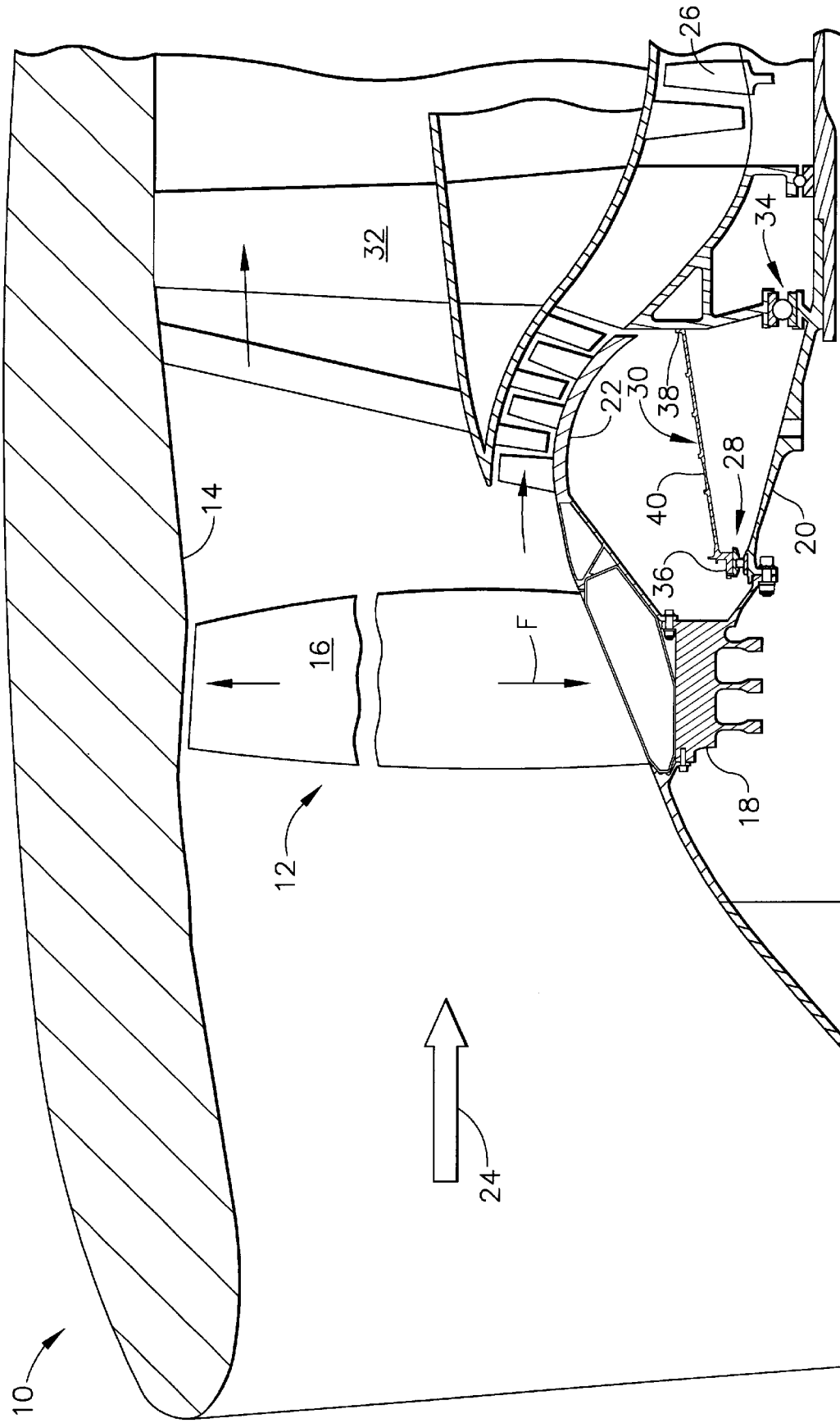
FIG. 1 is a partly sectional, elevational view of the fan section of a turbofan gas turbine engine in accordance with an exemplary embodiment of the present invention.

Illustrated in FIG. 1 is the front portion of a turbofan gas turbine engine 10 configured for powering an aircraft in flight. The engine is axisymmetrical about a longitudinal or axial centerline axis and includes a fan 12 mounted concentrically inside a surrounding fan casing 14.

The fan 12 includes a row of relatively large rotor fan blades 16 extending radially outwardly from a supporting rotor disk 18. The disk in turn is suitably joined to a fan shaft 20.

In the exemplary embodiment illustrated in FIG. 1, a low pressure or booster compressor 22 is disposed downstream from the fan and is commonly joined to the fan shaft for initially pressurizing a lower portion of ambient air 24. The fan itself pressurizes the air during operation, the outer portion of which is discharged from the engine for producing propulsion thrust.

The inner portion of the air from the fan is channeled through the booster compressor and in turn to a multi-stage axial compressor 26, shown in forward part, which further compresses the air which is then mixed with fuel and ignited in a combustor (not shown) for generating hot combustion gases which flow downstream through turbine stages (not shown) which extract energy therefrom for powering both the fan and compressor during operation.

The compressor 26 is powered by a high pressure turbine (not shown) by rotating a corresponding shaft therebetween. And, a low pressure turbine (not shown) powers the fan 12 by rotating the fan shaft 20 therebetween.

The fan 12 is rotatably supported during operation by a fan or forward bearing 28 surrounding the junction of the fan disk 18 and the fan shaft 20. The bearing 28 in turn is supported by a bearing support 30 which in turn is fixedly joined to an annular fan frame 32 disposed downstream therefrom.

The fan frame includes a plurality of radial struts which support the fan casing and nacelle at the outer ends thereof. The inner ends of the fan struts are joined to a common hub which additionally supports the fan shaft at additional bearings including a second bearing 34.

During normal operation, the fan rotates dynamically balanced and is driven by the fan shaft 20 at suitable operating speed for pressurizing the ambient air 24 and producing propulsion thrust. The various aerodynamic, centrifugal, and vibratory loads experienced by the fan are carried through the forward bearing 28 into the fan frame 32. The bearing support 30 and fan frame 32 are suitably sized for carrying these normal operational loads without accumulating life-limiting fatigue damage.

However, in the event of FOD for example, which may occur due to a large bird striking one of the fan blades 16, a part or all of one fan blade may be broken, as shown in FIG. 1, and correspondingly liberated into the surrounding fan casing wherein it is suitably contained. The liberated fan blade portion is ejected radially outwardly due to centrifugal force, with the fan then becoming unbalanced with a resulting radial imbalance force or load F directed in the radially inwardly, opposite direction. The imbalance force must be suitably accommodated for preventing secondary damage to other components of the engine during the time it takes to shut down operation of the damaged engine.

In accordance with the present invention, the bearing support effects a fan decoupler system for automatically decoupling the fan 12 at the first bearing 28 from the fan frame during abnormal rotor imbalance such as that due to a large bird strike or fan blade-out event in which a substantially large fan unbalance or imbalance load F is generated.

The damaged fan 12 itself introduces the radial imbalance force F in the event of abnormal operation, which imbalance force rotates about the engine centerline axis as the engine is shut down. Accordingly, the unbalanced fan 12 remains attached to the fan shaft 20 and carries the imbalance loads thereto.

The imbalance loads are in turn carried to the forward bearing 28 which rotatably supports the forward end of the fan shaft 20.

As initially illustrated in FIG. 1, the bearing support 30 is in the form of a hollow cone preferably formed as a single, unitary annular member. The bearing cone 30 diverges with an increasing diameter between an annular forward bearing seat 36 and an aft mounting flange 38 defining integral portions thereof at axially opposite ends. The forward seat 36 may have any conventional form such as a tubular bore in which the outer race of the forward bearing 28 may suitably be fixedly mounted. The aft flange 38 may have any conventional configuration such as a radial flange through which a row of mounting bolts may extend for fixedly mounting the bearing cone to the hub of the fan frame 32.

In accordance with the present invention, the bearing cone further includes an integral annular portion defining a fuse 40 suitably located between the axially opposite ends of the cone which is specifically sized in thickness to fail in shear under a predetermined abnormal imbalance load F, such as occurring during a blade-out condition.

The fuse 40 is an integral portion of the unitary bearing cone and is specifically configured for carrying normal operational loads from the fan through the forward bearing 28 and in to the fan frame 32 without failure and without the accumulation of low cycle fatigue damage. Yet, during abnormal operation of the fan in which the abnormal fan imbalance load F is generated, the fuse 40 will sever under shear for decoupling the fan and its forward bearing 28 from the remainder of the bearing support and thus permit unrestrained rotation of the fan supported in turn by the second bearing 34 inside the hub of the fan frame.

In this way, the fan critical speed will drop well below the maximum operating speed of the fan for substantially limiting orbit of the fan and rotor shaft, and correspondingly reducing radial loads generated therefrom during the abnormal operation. The affected engine will be shut down in a conventional manner, and the fan speed will decrease with relatively rapid deceleration crossing the lower fan critical speed with reduced peak loads.

By introducing the fuse 40 in the bearing support, the bearing support may be more efficiently designed with a substantial reduction in weight for carrying all required loads during normal operation of the engine without experiencing fatigue damage which would limit the life thereof. And, the integral fuse 40 permits maximum load carrying capability of the bearing support without life-limiting fatigue damage.

Figure 2:
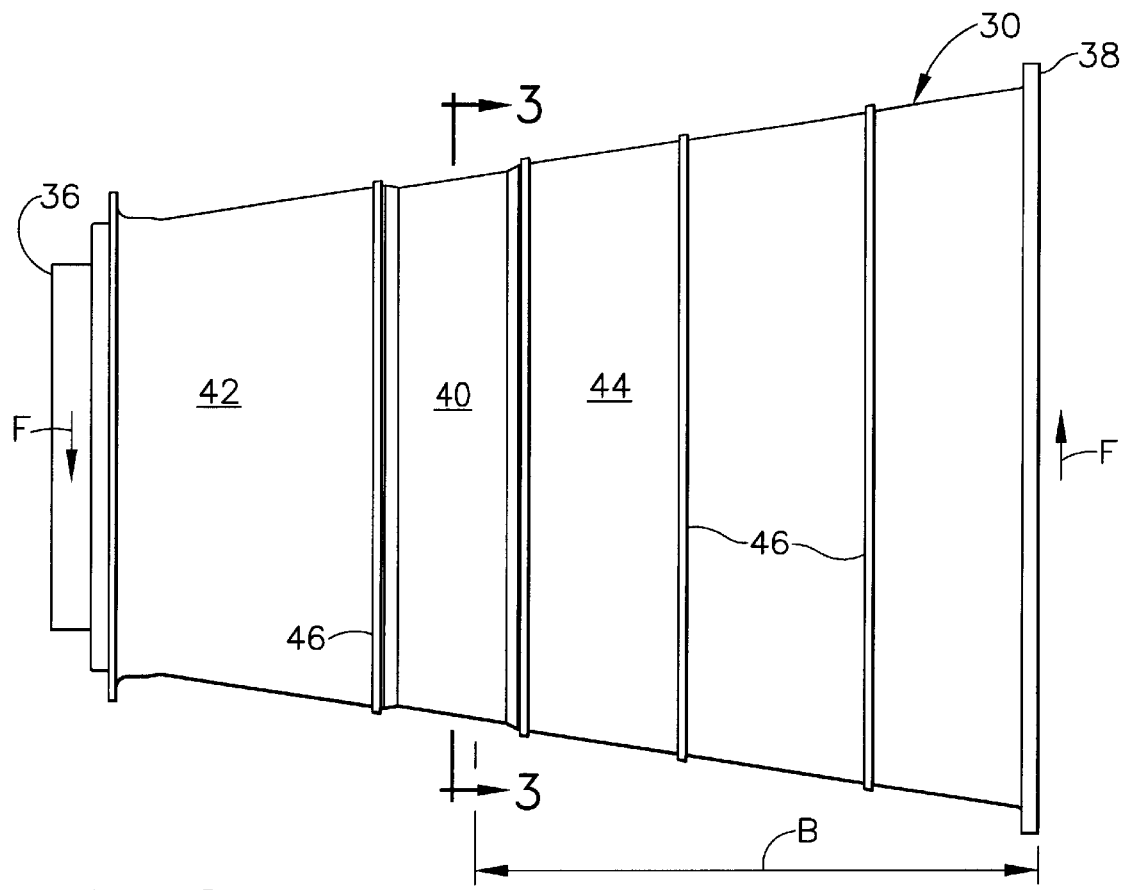
FIG. 2 is a side elevational view of the bearing support illustrated in FIG. 1 in accordance with an exemplary embodiment.
Figure 3:
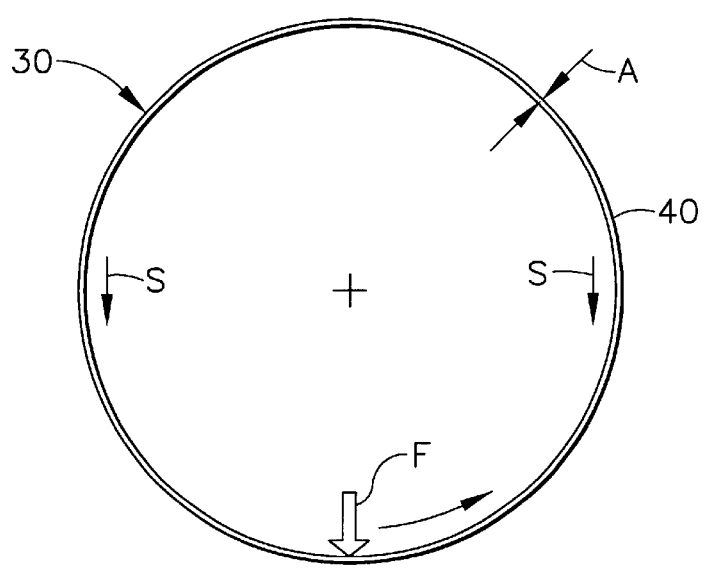
FIG. 3 is a radial sectional view through a fuse portion of the bearing support illustrated in FIG. 2 and taken along line 3—3.

In the preferred embodiment illustrated in FIGS. 2 and 3, the bearing cone 30 also includes an annular forward portion 42 extending aft from the forward seat 36 on one side of the fuse 40, and an annular aft portion 44 extending forward from the aft flange 38 on an opposite axial end of the fuse, with the fuse 40 being disposed axially therebetween.

Figure 4:
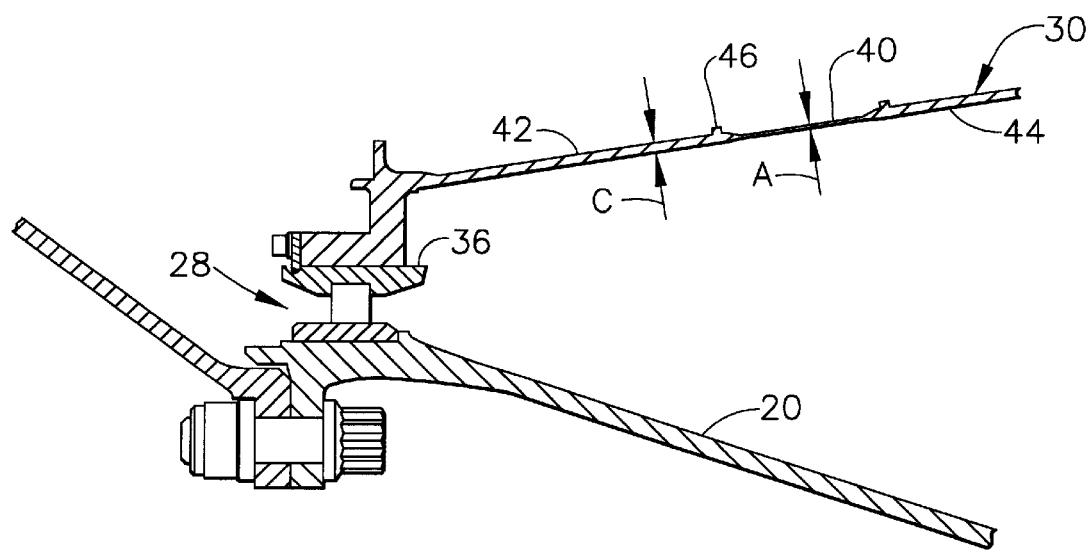
FIG. 4 is an enlarged, axial sectional view of the forward portion of the bearing support illustrated in FIG. 1.

As shown in FIGS. 3 and 4, the fuse 40 has a radial thickness A which is sized in accordance with the present invention to fail in shear under the intended amount of abnormal imbalance load F being transferred between the fan and frame during the FOD event, for example.

Since the bearing cone illustrated in FIG. 2 is a three dimensional annular member, the rotating imbalance load F is transferred in three dimensions between the forward and aft ends thereof. For example, the imbalance load F when directed vertically downwardly at the forward seat 36 effects an equal and opposite vertically upwardly reaction force F at the aft flange 38 due to the supporting fan frame.

This force couple creates a counterclockwise bending moment in the longitudinal plane illustrated in FIG. 2 creating tensile loads at the top of the cone and compressive loads at the bottom of the cone in the axial direction. The bearing cone must be sufficiently strong to accommodate these various loads, including the compressive loads to prevent undesirable axial buckling of the cone during both normal and abnormal operation of the engine.

As shown in FIG. 3, the rotating imbalance load F also creates shear loads S and corresponding shear stress in the radial plane of the bearing cone, with maximum shear loads or stress occurring 90 degrees from the direction of the imbalance load. In FIG. 3, the maximum or peak shear stress occurs at the 3 O'clock and 9 O'clock positions around the circumference of the bearing cone relative to the rotating imbalance load at the 6 O'clock position, and are used in accordance with the present invention to preferentially sever the bearing cone at the fuse 40 during abnormal operation.

By preferentially sizing the fuse 40 and locating the fuse 40 axially between the forward and aft ends of the bearing cone, the fuse may be introduced for carrying all required loads during normal operation, yet the fuse will fail in shear under the abnormal imbalance load for decoupling the fan from the bearing support. However, the fuse 40 is preferably spaced axially from the aft flange 38 at a spacing distance B to prevent axially compressive buckling failure thereof under the abnormal imbalance load, as well as under all normal loading.

The configuration, size, and location of the fuse 40 may vary depending upon the specific geometry of the bearing cone itself for introducing fuse-failure under shear without experiencing any axial buckling of the bearing cone itself. In FIG. 2, as the fuse 40 is spaced further away from the aft flange 38, compressive buckling margin may be increased. However, the fuse 40 should not be too close to the forward seat 36 to prevent secondary damage of the fan shaft 20 disposed radially therein from the torn remaining forward portion of the bearing cone after fuse severing.

Figure 5:
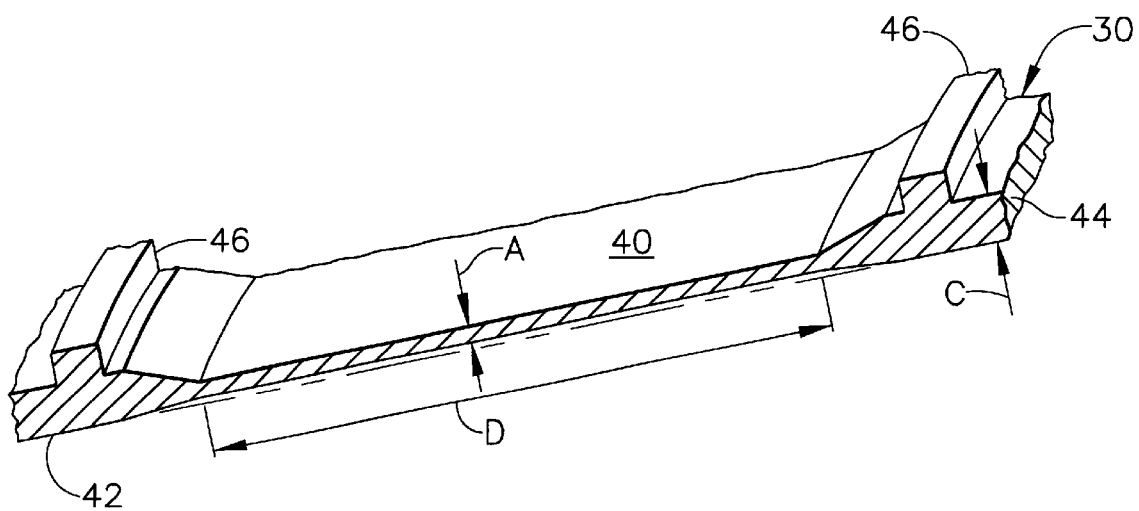
FIG. 5 is an enlarged, isometric view of the fuse portion of the bearing support illustrated in FIG. 4.

As shown in FIGS. 4 and 5, the fuse 40 is preferably thinner than at least one of the two adjoining forward and aft adjoining portions 42,44, and in the preferred embodiment is thinner than both portions. For example, the bearing cone 30 itself may have a substantially uniform nominal thickness C between its forward and aft ends and is locally thinner at the preferred site of the fuse portion 40 having a smaller thickness A For example, the nominal thickness C may be about 3.8 mm whereas the fuse thickness A may be about 1.8 mm for conventional metals used in constructing the bearing support.

The fuse 40 illustrated in FIGS. 4 an 5 is preferably recessed radially inwardly from the outer surfaces of the adjoining forward and aft portions. The inner surface of the bearing cone may be straight and continuous under the fuse 40 to provide a smooth surface to define a sump filled with oil. However, the bearing cone may also, or alternatively, be recessed radially outwardly from the inner surface of the adjoining forward and aft portions 42,44 to provide the locally thinner fuse 40 with a generally hour-glass axial cross section, if desired. In this way, a distinct and precisely located fuse 40 may be introduced in the otherwise constant thickness bearing cone to ensure a precise location for the fuse failure under abnormal imbalance load.

The fuse 40 itself is preferably imperforate, with the remainder of the bearing cone also being imperforate for maintaining uniformity of load carrying capability without undesirable local stress concentrations. However, the cone may include apertures as required for access therethrough.

As shown in FIG. 5, the fuse 40 has an axial length D which is preferably substantially greater than its radial thickness A, and is predetermined in size to effect plastic deformation in the preferred form of wrinkling circumferentially around the fuse following the circumferential rotation of the abnormal imbalance load.

As shown in FIG. 3, the peak shear stress due to the rotating imbalance load F occurs in the two angular locations around the cone 90 degrees from the rotating imbalance force. These peak shear stresses when reaching the yield strength of the parent material of the bearing cone locally create plastic deformation along the entire axial length D of the fuse at the two fuse sites disposed 180 degrees apart from each other.

The axial fuse length D illustrated in FIG. 5 should be suitably greater than the thickness A of the fuse so that the plastic deformation along the axial extent of the fuse is permitted to wrinkle over a finite area which in turn effectively decreases the load carrying capability of the bearing cone during the abnormal load event. As the imbalance load continues to rotate around the circumference of the bearing cone, plastic deformation continues with a decreasing amount of undeformed material available for carrying the abnormal load. The shear failure increases in magnitude, and in a zipper-like fashion severs the bearing cone around the circumference of the fuse 40.

In an exemplary embodiment, the axial length D of the fuse 40 is about 50 mm which is about an order of magnitude greater than the thickness A of the fuse itself. The axial length of the fuse 40 need only be sufficient to ensure continuation of the shear failure during the abnormal rotating imbalance force. If the axial length of the fuse is too short, adequate plastic deformation may not occur resulting in fatigue failure of the fuse in an indeterminate number of cycles of the rotating imbalance force.

If the axial length of the fuse 40 is greater than that required to initiate rapid fuse failure under the imbalance load, the strength and stiffness of the bearing cone for normal operation may be undesirably reduced. For each design application, the preferred length of the fuse may be determined for maximizing strength and stiffness during normal operation of the bearing cone, while permitting rapid failure of the fuse during the abnormal imbalance load.

Since the bearing cone 30 illustrated in FIG. 2 must have sufficient strength and stiffness for carrying all loads during normal operation of the bearing cone, the configuration and extent of the fuse 40 should be minimized for normal operation of the bearing support, yet nevertheless being capable of rapid failure during the designed-for failure event.

As illustrated in FIG. 5, the fuse 40 preferably has a substantially constant radial thickness A circumferentially around the bearing cone and, the remainder of the bearing cone extending forwardly and aftly from the fuse preferably also has a substantially constant thickness C, except as locally thickened for defining the forward bearing seat 36 and the aft mounting flange 38.

And, the bearing cone 30 preferably includes integral circumferential stiffening ribs 46 on opposite axial ends of the fuse 40, as well as other locations where desired. In the embodiment illustrated in FIG. 2, there are four circumferential ribs 46 spaced axially apart from each other.

Furthermore, the bearing cone 30 may also include axial stiffening ribs (not shown) extending along the axial extent of the bearing cone between the forward seat 36 and the aft flange 38, and preferably excluding the fuse 40 as desired. In this way, the various ribs may be used for improving the overall strength of the bearing cone and stiffness thereof, while minimizing the thickness of the annular wall defining the cone itself.

The bearing cone may thusly be configured for enjoying normal stiffness and corresponding dynamic response during operation, with the cone carrying all normal loads required between its forward seat 36 and aft flange 38, with the fuse 40 being available to sever the bearing cone thereat during the designed-for imbalance load.

A particular advantage of the bearing support fuse disclosed above is that the bearing cone maintains high strength during all normal operation without life-limiting fatigue damage. Only in the event of the abnormal imbalance load does the local stress in the fuse 40 exceed the yield strength of the parent material. The resulting local plastic deformation exacerbates the failure mechanism continuing the plastic failure around the circumference of the fuse.

In a preferred embodiment, complete fuse failure or separation may occur with a load exceeding the yield strength of the material by as little as about two percent in excess thereof. This is in contrast to shear-pin fuse designs which can require failure loads in excess of about 16% of the yield strength, with an associated failure mechanism of accumulating fatigue damage.

The fuse 40 described above is an integral and unitary part of the bearing support itself and is effective for carrying all normal loads during operation without experiencing life-limiting fatigue damage. Only during the abnormal failure event will the local shear stress in the fuse exceed the yield strength thereof leading to local plastic deformation and rapid failure for severing the bearing support. In this way, the fuse 40 decreases to a minimum the variability between maximum load carrying capability of the bearing support, and the minimum load carrying capability thereof without life-limiting fatigue damage.

In accordance with another feature of the present invention as illustrated in FIG. 1, the forward bearing 28 is preferably a roller bearing of any conventional configuration, instead of a ball bearing typically provided at this number one bearing location. Correspondingly, the second bearing 34 is preferably a ball bearing of any conventional form instead of a roller bearing typically used at this location aft of the first bearing 28.

A ball bearing enjoys thrust bearing capability as well as radial load carrying capability. Accordingly, in the event of fuse failure under the abnormal imbalance force F, the bearing cone 30 is severed at the fuse 40 and permits unrestrained rotation of the fan shaft 20 at the now unsupported forward bearing 28. The fan must then be supported by the second bearing 34 during engine shut down, with the ball bearing 34 being effective for carrying thrust loads from the fan as the orbital rotation of the fan decreases during shut down.

A particular advantage of the fuse 40 disclosed above is its introduction as an integral portion of the bearing cone 30 itself in a compact configuration which readily fits within the limited available space behind the fan. The bearing cone enjoys full strength and stiffness for supporting the fan during normal operation and carrying all required loads to the fan frame. During normal operation, the fuse 40 does not introduce a life-limiting fatigue site, nor does it compromise the strength or stiffness of the bearing cone.

Only during abnormal operation, such as a blade-out event, will the substantial rotating imbalance load F be generated which is carried through the fuse 40 which rapidly fails in shear in a precise and known manner. The bearing support is thusly severed in two parts for decoupling the fan at its forward bearing 28 from the fan frame. The resulting soft mounting of the decoupled fan reduces secondary damage in the engine, with the severed bearing cone then being replaceable in a maintenance outage.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A bearing support for supporting a gas turbine engine fan to a fan frame comprising:
 a hollow cone diverging between a forward bearing seat and an aft mounting flange at axially opposite ends; and
 said cone including a radially thinner annular portion defining a fuse having an axial length greater by about an order of magnitude than a radial thickness of said fuse to fail in shear wrinkling circumferentially around said fuse following circumferential rotation of abnormal imbalance load transfer between said fan and frame.

2. A support according to claim 1 wherein said fuse is spaced axially from said aft flange to prevent axially compressive buckling thereof under said abnormal load.

3. A support according to claim 2 wherein said fuse is disposed axially closer to said forward bearing seat than to said aft mounting flange.

4. A support according to claim 3 wherein said cone includes forward and aft annular portions adjoining opposite ends of said fuse, and said fuse is recessed radially inwardly from said forward and aft portions.

5. A support according to claim 4 wherein said fuse is imperforate.

6. A support according to claim 4 wherein said fuse has an axial length greater than said radial thickness by a factor of about 28.

7. A support according to claim 4 wherein said fuse has a substantially constant thickness circumferentially around said cone.

8. A support according to claim 4 wherein said cone further includes circumferential ribs on opposite axial ends of said fuse.

9. A bearing support for supporting a gas turbine engine fan to a fan frame comprising:
 a hollow cone diverging between a forward bearing seat and an aft mounting flange at axially opposite ends; and
 said cone including an annular forward portion extending aft from said forward seat, an annular aft portion extending forward from said aft flange, and an annular fuse being thinner than at least one of said forward and aft portions and having an axial length greater by about an order of magnitude than a radial thickness of said fuse for failing in shear wrinkling circumferentially around said fuse following circumferential rotation of abnormal imbalance load transfer between said fan and frame.

10. A support according to claim 9 wherein said fuse is recessed radially inwardly in said cone.

11. A support according to claim 10 wherein said fuse is imperforate.

12. A support according to claim 11 wherein said fuse is additionally recessed radially outwardly in said cone.

13. A support according to claim 11 wherein said fuse is sized in radial thickness and axial length to fail under said abnormal load exceeding the yield strength of said cone by as little as about two percent in excess thereof.

14. A support according to claim 11 wherein said fuse has a substantially constant thickness circumferentially and axially around said cone.

15. A support according to claim 11 wherein said fuse is spaced axially from said aft flange more than from said forward bearing seat to prevent axially compressive buckling thereof under said abnormal load.

16. A support according to claim 11 wherein said fuse is thinner than said cone forward portion.

17. A support according to claim 11 wherein said fuse is thinner than said cone aft portion.

18. A fan decoupler system comprising:
 a fan including a row of blades extending from a disk attached to a fan shaft;
 a roller bearing rotatably supporting said fan shaft adjacent said fan;
 a fan frame spaced aft from said roller bearing;

a bearing support disposed axially between said roller bearing and said fan frame and radially inwardly of said fan blades, and including a hollow cone diverging between a forward seat supporting said roller bearing and an aft mounting flange fixedly joined to said fan frame; and said cone further includes an annular forward portion extending aft from said forward seat, and an annular aft portion extending forward from said aft flange, and an annular fuse being thinner than said aft portion of said cone and having an axial length greater by about an order of magnitude than a radial thickness of said fuse for failing in shear wrinkling circumferentially around said fuse following circumferential rotation of abnormal imbalance load transfer between said fan and frame.

19. A system according to claim 18 further comprising a ball bearing mounted between said frame and fan shaft aft of said roller bearing for carrying thrust loads from said fan upon failure of said fuse.

20. A system according to claim 19 wherein said fuse is imperforate.

21. A system according to claim 20 wherein said fuse has a substantially constant thickness circumferentially and axially around said cone.

22. A system according to claim 21 wherein said cone further includes circumferential ribs on opposite axial ends of said fuse and two additional circumferential ribs spaced apart axially in said cone aft portion.

* * * * *